(12) United States Patent
Jeong et al.

(10) Patent No.: US 11,103,003 B2
(45) Date of Patent: Aug. 31, 2021

(54) MODIFIED CROSS-SECTION LYOCELL MATERIAL FOR TOBACCO FILTER, AND PREPARATION METHOD THEREFOR

(71) Applicants: KOLON INDUSTRIES, INC., Gwacheon-si (KR); KT&G CORPORATION, Daejeon (KR)

(72) Inventors: Jong Cheol Jeong, Yongin-si (KR); Sang Woo Jin, Yongin-si (KR); Sang Yoel Lee, Yongin-si (KR); Woo Chul Kim, Yongin-si (KR); Sang Mok Lee, Yongin-si (KR); Jong Yeol Kim, Daejeon (KR); Soo Ho Kim, Daejeon (KR); Bong Su Cheong, Daejeon (KR); Hyun Suk Cho, Daejeon (KR); Sung Jong Ki, Daejeon (KR)

(73) Assignees: KOLON INDUSTRIES, INC., Seoul (KR); KT&G CORPORATION, Daejeon (KR)

(*) Notice: Subject to any disclaimer, the term of this patent is extended or adjusted under 35 U.S.C. 154(b) by 473 days.

(21) Appl. No.: 15/322,753

(22) PCT Filed: Jun. 30, 2015

(86) PCT No.: PCT/KR2015/006665
§ 371 (c)(1),
(2) Date: Dec. 29, 2016

(87) PCT Pub. No.: WO2016/003145
PCT Pub. Date: Jan. 7, 2016

(65) Prior Publication Data
US 2017/0156394 A1      Jun. 8, 2017

(30) Foreign Application Priority Data

Jun. 30, 2014  (KR) .................. 10-2014-0081316
Jun. 29, 2015  (KR) .................. 10-2015-0092126

(51) Int. Cl.
*A24D 3/00* (2020.01)
*A24D 3/06* (2006.01)
(Continued)

(52) U.S. Cl.
CPC ............. *A24D 3/064* (2013.01); *A24D 3/068* (2013.01); *A24D 3/10* (2013.01); *B29C 48/0019* (2019.02);
(Continued)

(58) Field of Classification Search
CPC ... A24D 3/00; A24D 3/02; A24D 3/04; A24D 3/062–064; B29C 41/24–265;
(Continued)

(56) References Cited

U.S. PATENT DOCUMENTS 3,756,253 A   9/1973  Honda et al.
4,246,221 A   1/1981  McCorsley
(Continued)

FOREIGN PATENT DOCUMENTS

CN   1123042 A   5/1996
CN   1139961 A   1/1997
(Continued)

OTHER PUBLICATIONS

R. Beyreuther and H. Brunig, Dynamics of Fibre Formation and Processing, p. 46 (Year: 2007).*
(Continued)

*Primary Examiner* — Matthew D Matzek
(74) *Attorney, Agent, or Firm* — Sughrue Mion, PLLC

(57) ABSTRACT

This invention relates to a lyocell material for a tobacco filter and a method of manufacturing the same, and more particularly to a lyocell fiber having a modified cross-section for a tobacco filter, wherein the cross-sectional shape of a monofilament contained in a lyocell fiber is controlled to increase the external surface area of the fiber, after which then crimps (Continued)

are formed, thereby exhibiting properties equal or superior to those of conventional lyocell materials, even when used in a small amount.

8 Claims, 3 Drawing Sheets

(51) Int. Cl.
  *B29C 48/05* (2019.01)
  *B29C 48/00* (2019.01)
  *B29C 48/21* (2019.01)
  *B29C 48/345* (2019.01)
  *D01D 5/253* (2006.01)
  *D01F 2/00* (2006.01)
  *D01D 4/02* (2006.01)
  *D01D 5/088* (2006.01)
  *D01D 5/28* (2006.01)
  *A24D 3/10* (2006.01)
  *D01F 2/08* (2006.01)
  *B29K 1/00* (2006.01)
  *B29L 31/14* (2006.01)
  *B29L 31/00* (2006.01)

(52) U.S. Cl.
  CPC ............ *B29C 48/022* (2019.02); *B29C 48/05* (2019.02); *B29C 48/21* (2019.02); *B29C 48/345* (2019.02); *D01D 4/02* (2013.01); *D01D 5/088* (2013.01); *D01D 5/253* (2013.01); *D01D 5/28* (2013.01); *D01F 2/00* (2013.01); *D01F 2/08* (2013.01); *B29K 2001/08* (2013.01); *B29L 2031/14* (2013.01); *B29L 2031/7416* (2013.01); *D10B 2503/00* (2013.01)

(58) Field of Classification Search
  CPC .. D01D 5/00; D01D 5/06; D01D 5/22; D01D 5/253
  USPC .......... 428/397, 82, 88, 91, 295.7, 362, 369, 428/364; 96/66; 55/524, 527, 528; 162/157.7
  See application file for complete search history.

(56) References Cited

U.S. PATENT DOCUMENTS

| | | | |
|---|---|---|---|
| 4,416,698 A | 11/1983 | McCorsley | |
| 5,063,945 A | 11/1991 | Sugihara et al. | |
| 5,225,277 A * | 7/1993 | Takegawa | A24D 3/10 131/344 |
| 5,707,737 A * | 1/1998 | Mori | D01D 5/253 106/170.47 |
| 5,738,119 A | 4/1998 | Edwards, III et al. | |
| 6,017,479 A | 1/2000 | Helms, Jr. et al. | |
| 6,177,194 B1 | 1/2001 | Koppe | |
| 7,534,379 B2 | 5/2009 | Ellison et al. | |
| 2004/0126577 A1 | 7/2004 | Lee et al. | |
| 2004/0237982 A1* | 12/2004 | Dollhopf | A24D 3/10 131/331 |
| 2005/0019564 A1 | 1/2005 | Kwon et al. | |
| 2005/0160939 A1* | 7/2005 | Kwon | B60C 9/0042 106/200.2 |
| 2005/0283958 A1 | 12/2005 | Sanderson et al. | |
| 2005/0287368 A1 | 12/2005 | Corallo et al. | |
| 2009/0127750 A1 | 5/2009 | Bhushan et al. | |
| 2010/0021711 A1* | 1/2010 | Schrempf | D01D 5/253 428/221 |
| 2010/0281662 A1 | 11/2010 | Manner et al. | |
| 2016/0286854 A1 | 10/2016 | Jeong et al. | |
| 2017/0156394 A1 | 6/2017 | Jeong et al. | |
| 2018/0007952 A1 | 1/2018 | Jin et al. | |

FOREIGN PATENT DOCUMENTS

| | | |
|---|---|---|
| CN | 1356412 A | 7/2002 |
| CN | 1576403 A | 2/2005 |
| CN | 1688637 A | 10/2005 |
| CN | 101501252 A | 8/2009 |
| CN | 102595942 A | 7/2012 |
| DE | 10053359 A1 | 5/2002 |
| EP | 0797696 B1 | 7/1998 |
| EP | 0 766 519 | 11/1998 |
| EP | 0703997 B1 | 8/1999 |
| EP | 2490557 A1 | 8/2012 |
| EP | 3051011 A1 | 8/2016 |
| GB | 1155070 A | 6/1967 |
| GB | 2474694 | 4/2011 |
| JP | 48-80824 A | 10/1973 |
| JP | 9-509987 A | 10/1997 |
| JP | 10-168650 A | 6/1998 |
| JP | 10-505886 A | 6/1998 |
| JP | 2001-501687 A | 2/2001 |
| JP | 2001-510245 A | 7/2001 |
| JP | 2001316936 A | 11/2001 |
| JP | 2005-42286 A | 2/2005 |
| JP | 2007-534789 A | 11/2007 |
| JP | 2009-540139 A | 11/2009 |
| KR | 10-2003-0061374 A | 7/2003 |
| KR | 10-0471549 B1 | 3/2005 |
| KR | 10-0769974 B1 | 10/2007 |
| KR | 10-2012-0032932 A | 4/2012 |
| KR | 10-1455006 B1 | 10/2014 |
| KR | 10-1455002 B1 | 11/2014 |
| WO | 94/27903 A1 | 12/1994 |
| WO | 94/28220 | 12/1994 |
| WO | 95/24520 | 9/1995 |
| WO | 0063470 | 10/2000 |
| WO | 2006/071101 | 7/2006 |
| WO | 2007/143762 A1 | 12/2007 |
| WO | 2009/000453 | 12/2008 |
| WO | 2011/048397 A1 | 4/2011 |
| WO | 2011048397 A1 | 4/2011 |
| WO | 2012002729 A2 | 1/2012 |
| WO | 2014/009498 | 1/2014 |

OTHER PUBLICATIONS

International Searching Authority, International Search Report of PCT/KR2015/006665 dated Sep. 22, 2015 [PCT/ISA/210].
European Patent Office; Communication dated Feb. 8, 2018, in counterpart application No. 15815965.7.
European Patent Office, Office Action dated Oct. 2, 2018 in European Application No. 15815965.7.
Japanese Patent Office; Communication dated Jul. 2, 2018 in counterpart JP application No. 2016-574041.
The State Intellectual Property Office of the P.R.C.; Communication dated Jul. 9, 2018 in counterpart CN application No. 201580035675.2.
Japanese Patent Office, Communication dated Oct. 30, 2017 in counterpart application No. 2016-574041.
Chavan et al., "Development and Processing of Lyocell", Indian Journal of Fibre & Textile Research, vol. 29, Dec. 2004, pp. 483-492, 10 pages total.
European Patent Office, Supplementary European Search Report dated Feb. 1, 2017 by the European Patent Office in European Application No. 14 817842.
International Search Report of PCT/KR2014/004881 dated Aug. 27, 2014 [PCT/ISA/210].
Japanese Patent Office, Communication dated Dec. 14, 2016, issued in counterpart Japanese Application No. 2016-523626.
Russian Patent Office, dated May 25, 2017 in counterpart Russian Application No. 2016102643.
The State Intellectual Property Office of People's Republic of China; Communication dated Jan. 17, 2017 in counterpart application No. 201480036781.8.
Tencel HS260 Lyocell Fiber for Nonwovens, 1 page total.
International Search Report for PCT/KR2015/014207 dated Apr. 4, 2016.

(56) References Cited

OTHER PUBLICATIONS

"Lubrication", Random House Dictionary, copyright Random House, Inc. 2017, accessed at Dictionary.com on Sep. 26, 2017, 2 pages total.
Bajaj, P., "Spin Finishes for Manufactured Fibres", Manufactured Fibre Technology, 1997, Chapman & Hall, London, 31 pages total.
European Patent Office, Communication dated Jul. 12, 2018, issued in Application No. 15875602.3.
United States Patent and Trademark Office, communication dated Oct. 4, 2017 in U.S. Appl. No. 14/392,274.
United States Patent and Trademark Office, communication dated Apr. 26, 2018 in U.S. Appl. No. 14/392,274.
United States Patent and Trademark Office, communication dated Sep. 21, 2018 in U.S. Appl. No. 14/392,274.
United States Patent and Trademark Office, communication dated Mar. 4, 2019 in U.S. Appl. No. 14/392,274.
United States Patent and Trademark Office, communication dated May 9, 2019 in U.S. Appl. No. 15/540,873.

* cited by examiner

MODIFIED CROSS-SECTION LYOCELL MATERIAL FOR TOBACCO FILTER, AND PREPARATION METHOD THEREFOR

CROSS REFERENCE TO RELATED APPLICATIONS

This application is a National Stage of International Application No. PCT/KR2015/006665, filed Jun. 30, 2015, claiming priorities based on Korean Patent Application Nos. 10-2014-0081316, filed Jun. 30, 2014, and 10-2015-0092126, filed Jun. 29, 2015, the contents of all of which are incorporated herein by reference in their entirety.

TECHNICAL FIELD

The present invention relates to a fiber for a tobacco filter, and more particularly to a lyocell material having a modified cross-section for a tobacco filter, having an increased external surface area and space occupancy, compared to conventional lyocell materials, and to a method of manufacturing the same.

BACKGROUND ART

Tobacco, which is a typical favorite of adults, is largely classified into pipe tobacco in which finely chopped tobacco leaves are placed in a pipe, cigarettes in which finely chopped tobacco leaves are rolled in a paper, and cigars in which whole dried tobacco leaves are rolled, and may also be provided in the form of snuff, water tobacco, chewing tobacco, or electronic tobacco, depending on the region or fashion. Particularly in the case of cigarettes, which are generally referred to by the term "tobacco", cigarette from old times took a form in which both ends thereof were exposed, but have gradually come to be manufactured in the form of filtered tobacco.

Tobacco filters were introduced a long time ago to prevent the accumulation of spit on tobacco leaves, but currently function to filter a variety of smoke components such as tar and nicotine. The tobacco filter is made of fibers, such as wool, cotton or rayon, or paper, but a material such as cellulose acetate has recently come to be useful. Cellulose acetate has superior hygroscopicity, durability, and air permeability, and is thus suitable for use in a filter. These days, however, the price of cellulose acetate yarn is internationally increasing, and unstable supply and high demand occur in countries that rely entirely on imports.

Cellulose acetate fibers may be obtained through a dry-spinning process in a manner in which cellulose acetate flakes are dissolved in a solvent such as acetone to yield a spinning dope, which is then fed into a spinning nozzle and discharged at high temperatures. Particularly, in order to apply cellulose acetate fibers to a tobacco filter, the total fineness of fibers is appropriately set after the spinning process, and the fibers are then manufactured into a fiber tow having a crimped band, which is then opened using a plug-winding device and impregnated with a plasticizer, followed by forming a rod shape and then cutting it to a predetermined length.

Meanwhile, the tobacco residue, including the filter portion, other than the tobacco portion, which becomes ash during the smoking process, is recovered as garbage and is mainly buried. In some cases, however, such butts are not recovered but are allowed to remain in the environment. Hence, cellulose acetate is maintained in its original form for about 1 to 2 years in soil even if essentially biodegradable, and thus the biodegradation thereof is not necessarily regarded as good. In real-world applications, a considerably long period of time is required to completely biodegrade tobacco filters buried in the soil.

Under such situations, a variety of methods for manufacturing biodegradable filter tows have been proposed. For example, International Publication Patent No. WO 2000-053832 discloses a biodegradable cellulose acetate structure and a tobacco filter, the structure comprising cellulose acetate and a biodegradation promoter including at least one compound dselected from among cellulose phosphate and starch phosphate. Also, U.S. Pat. No. 8,327,856 discloses an environmentally degradable tobacco filter, manufactured by bringing a cellulose acetate tow into contact with a weak organic acid and an inorganic ester salt having a pH adjusted to 8 or less, encapsulated in a matrix material.

In addition thereto, there are devised various techniques using an additive for increasing the rate of degradation of cellulose acetate, cellulose acetate having a low degree of substitution (DS) and thus increased biodegradability, and filter tow materials including biodegradable polymer composites, such as polyhydroxybutyrate (PHB)/polyvinyl butyral (PVB) and starch. However, it is not easy to realize an acceptable compromise between the rate of biodegradation, the absorption profile of filter materials, and the features of tobacco tastes, and methods of producing filters able to simultaneously achieve industrial purposes and solve waste problems are still unsatisfactory.

DISCLOSURE

Technical Problem

Therefore, the present invention is intended to provide a lyocell fiber for a tobacco filter, which has an increased external surface area, so that it may be used in lieu of a cellulose acetate tow, the price thereof is internationally increasing and in which unstable supply and high demand occur, and may exhibit the basic properties required of tobacco filters in a manner equal to or better than conventional materials, even when used in a small amount, while showing high biodegradability.

Technical Solution

Culminating in the present invention, intensive and thorough research into tobacco filter materials having biodegradability while maintaining conventional properties, carried out by the present inventors aiming to solve the problems encountered in the related art, resulted in the finding that when a lyocell fiber, especially a lyocell fiber having a modified cross-section with a large external surface area and space occupancy, is used, not only biodegradability but also properties equal or superior to those of conventional tobacco filters may be exhibited even upon use of only a small amount, compared to fibers having a circular cross-section.

A first embodiment of the present invention provides a method of manufacturing a lyocell material having a modified cross-section for a tobacco filter, comprising: (S1) spinning a lyocell spinning dope comprising a cellulose pulp and an N-methylmorpholine-N-oxide (NMMO) aqueous solution using a spinneret having a plurality of unit holes each having multiple holes; (S2) coagulating the lyocell spinning dope spun in (S1), thus obtaining a lyocell multi-filament; (S3) water-washing the lyocell multifilament obtained in (S2); (S4) oiling the lyocell multifilament water-washed in (S3); and (S5) crimping the lyocell multifilament oiled in (S4), thus obtaining a crimped tow, wherein the lyocell multifilament comprises a monofilament having a modified cross-section, the modified cross-section includes a plurality of projections, and the plurality of projections comes into contact with a first virtual circle and a second virtual circle included in the first virtual circle, is integrally formed with the second virtual circle serving as a center, and comes into contact with the first virtual circle at ends thereof, a ratio L1/L2 of a radius L1 of the first virtual circle to a radius L2 of the second virtual circle ranging from 1.5 to 5.0.

As such, the spinneret may be configured to have a plurality of unit holes each having three holes, and the number of points of contact of the first virtual circle and the second virtual circle with the cross-section of the monofilament is preferably 3.

In the first embodiment, the lyocell spinning dope of (S1) may comprise 6 to 16 wt % of the cellulose pulp and 84 to 94 wt % of the N-methylmorpholine-N-oxide aqueous solution based on the total weight of the spinning dope.

Here, the cellulose pulp may comprise 85 to 97 wt % of alpha-cellulose based on the total weight of the pulp and may have a degree of polymerization (DPw) of 600 to 1700.

The coagulating in (S2) may comprise primary coagulation using air quenching (Q/A) including supplying cold air to the spinning dope and secondary coagulation including immersing the primarily coagulated spinning dope in a coagulation solution.

The air quenching may be performed by supplying the cold air at a temperature of 4 to 15° C. and a wind velocity of 5 to 50 m/s to the spinning dope, and the coagulation solution may have a temperature of 30° C. or less.

In the first embodiment, (S5) may comprise crimping the oiled lyocell multifilament using a stuffer box to yield a crimped tow having 15 to 60 crimps per inch.

In the first embodiment, (S5) may be performed by supplying steam and applying pressure to the lyocell multifilament so that the lyocell multifilament is crimped.

As such, (S5) may be performed by supplying the steam so that a pressure of the steam is 0.05 to 2.0 kgf/cm², and the lyocell multifilament is pressed and crimped using a press roller at a pressure of 1.0 to 4.0 kgf/cm².

A second embodiment of the present invention provides a lyocell material having a modified cross-section for a tobacco filter, manufactured by spinning a lyocell spinning dope comprising a cellulose pulp and an N-methylmorpholine-N-oxide (NMMO) aqueous solution to produce a lyocell multifilament and crimping the lyocell multifilament, wherein the lyocell multifilament comprises a monofilament having a modified cross-section, the modified cross-section includes a plurality of projections, and the plurality of projections comes into contact with a first virtual circle and a second virtual circle included in the first virtual circle, is integrally formed with the second virtual circle serving as a center, and comes into contact with the first virtual circle at ends thereof, a ratio L1/L2 of a radius L1 of the first virtual circle to a radius L2 of the second virtual circle ranging from 1.5 to 5.0.

As such, the number of points of contact of the first virtual circle and the second virtual circle with the cross-section of the monofilament is preferably 3.

In the second embodiment, the lyocell spinning dope may comprise 6 to 16 wt % of the cellulose pulp and 84 to 94 wt % of the N-methylmorpholine-N-oxide aqueous solution based on the total weight of the spinning dope.

Also, the cellulose pulp may comprise 85 to 97 wt % of alpha-cellulose based on the total weight of the pulp and may have a degree of polymerization (DPw) of 600 to 1700.

In the second embodiment, the lyocell material may have a space occupancy of 150 to 400%, as defined as Equation 1 below.

$$\text{Space occupancy}(\%) = (\text{area of first virtual circle} / \text{cross-sectional area of monofilament contained in lyocell fiber}) \times 100 \quad \text{(Equation 1)}$$

In the second embodiment, the first virtual circle may have a radius L1 of 8 to 30 μm, and the second virtual circle may have a radius L2 of 3 to 12 μm.

Advantageous Effects

According to the present invention, a lyocell fiber having a modified cross-section is increased in external surface area and space occupancy compared to a conventional lyocell fiber having a circular cross-section, thus exhibiting high biodegradability and environmentally friendly properties. Even when such a lyocell fiber is applied in a small amount to manufacture a tobacco filter, it readily adsorbs a smoke component, and properties equal or superior to those of conventional tobacco filters can be exhibited.

DESCRIPTION OF REFERENCE NUMERALS IN THE DRAWINGS

1: modified cross-section of monofilament
3: long axis of projection (radius of first virtual circle (circumscribed circle))
4: recess of projection (point of contact with first virtual circle (circumscribed circle))
5: end of projection (point of contact with second virtual circle (inscribed circle))
11: first virtual circle (circumscribed circle)
12: second virtual circle (inscribed circle)

BEST MODE

An aspect of the present invention addresses a lyocell material having a modified cross-section for a tobacco filter, obtained by spinning a lyocell spinning dope comprising a cellulose pulp and an N-methylmorpholine-N-oxide (NMMO) aqueous solution to produce a lyocell multifilament, which is then crimped.

In addition, the present invention addresses a method of manufacturing a lyocell material having a modified cross-section for a tobacco filter, comprising the steps of (S1) spinning a lyocell spinning dope comprising a cellulose pulp and an N-methylmorpholine-N-oxide (NMMO) aqueous solution, (S2) coagulating the lyocell spinning dope spun in (S1), thus obtaining a lyocell multifilament, (S3) water-washing the lyocell multifilament obtained in (S2), (S4) oiling the lyocell multifilament water-washed in (S3), and (S5) crimping the lyocell multifilament oiled in (S4), thus obtaining a crimped tow.

In the present invention, the multifilament is composed of a monofilament having a modified cross-section, the modified cross-section has a plurality of projections, and the plurality of projections comes into contact with a first virtual circle and a second virtual circle included in the first virtual circle, is integrally formed with the second virtual circle serving as a center, and comes into contact with the first virtual circle at ends thereof.

Figure 1:
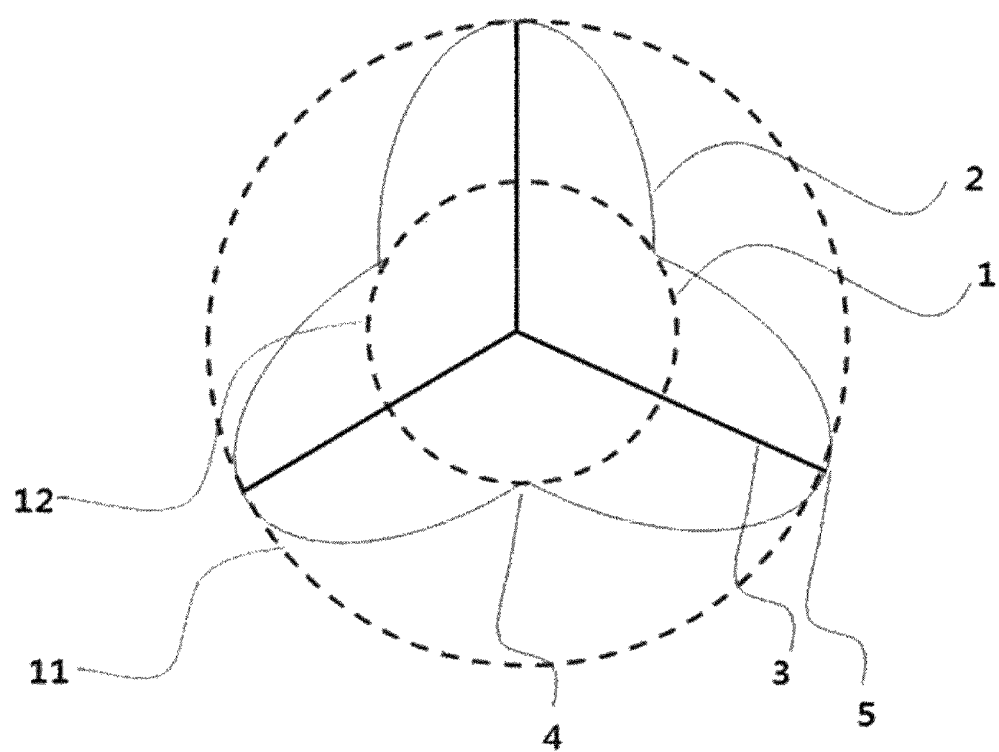
FIG. 1 schematically shows the cross-section of a monofilament of a lyocell fiber having a modified cross-section according to an embodiment of the present invention.

As used herein, the term "modified cross-section" refers to a cross-sectional shape having a plurality of projections. Specifically, as shown in FIG. 1, the modified cross-section indicates a cross-section configured to include a plurality of projections, which are integrally formed with a center 1.

More specifically, the size and shape of the modified cross-section may be defined within the range of a first virtual circle 11, formed by connecting the end points of the projections, and a second virtual circle 12 included in the first virtual circle 11. As such, the first virtual circle 11 is a circle having a radius greater than that of the second virtual circle 12, and they may or may not be concentric.

According to a preferred aspect of the present invention, the modified cross-section may have a shape in which the ratio L1/L2 of the radius L1 of the first virtual circle (a circumscribed circle of the projections) to the radius L2 of the second virtual circle (an inscribed circle of the projections) falls in the range of 1.5 to 5.0. If the radius ratio L1/L2 is less than 1.5, the cross-section approaches a circular shape, thus remarkably decreasing space occupancy in the present invention. On the other hand, if the radius ratio exceeds 5.0, it is difficult to control the manufacturing process.

The modified cross-section includes the projections, and the projections are integrally formed with the center 1 overlapping the second virtual circle 12, in which the ends 5 of respective projections are in contact with the first virtual circle 11, and in which the recesses 4 formed between the projections are in contact with the second virtual circle 12.

The number of points of contact of the first virtual circle and the second virtual circle with the cross-section of the monofilament is preferably set to 3 in order to increase space occupancy.

According to a preferred aspect of the present invention, the first virtual circle has a radius L1 of 8 to 30 μm and the second virtual circle has a radius L2 of 3 to 12 μm. When the radius of the first circle is 8 μm or more, it is possible to realize a modified cross-section, and when the radius of the first circle is 30 μm or less, a monofilament having fineness suitable for use in a fiber product may be formed. Also, when the radius of the second virtual circle is 3 μm or more, it is possible to realize a modified cross-section, and when the radius of the second virtual circle is 12 μm or less, a monofilament having fineness suitable for use in a fiber product may be formed.

The monofilament contained in the lyocell fiber of the present invention may have the modified cross-section mentioned above, and the lyocell fiber may have a space occupancy of 150 to 400%, as defined in Equation 1 below.

Space occupancy(%)=(area of first virtual circle/ cross-sectional area of monofilament contained in lyocell fiber)×100    (Equation 1)

Space occupancy is the proportion of space in a fiber substantially occupied by the monofilament due to the projections of the modified cross-section. In the case where the cross-section of the monofilament of the lyocell fiber has a circular shape, the cross-sectional area of the monofilament is equal to the area of the first virtual circle, and thus the space occupancy is 100%. However, in the case of the fiber having a modified cross-section having projections, the actual area of the fiber becomes large due to the projections. As the space occupancy increases, the external surface area of the fiber may become large.

In the present invention, the lyocell fiber may have space occupancy of 150 to 400%, and preferably 300 to 400%, as defined in Equation 1, in terms of increasing a specific surface area so that bulge properties or other properties such as interfacial adhesion properties, rapid drying properties, etc. become superior.

In order to maximize the external surface area of the lyocell fiber, in the present invention, the number of projections of the modified cross-section is preferably set to 3. Although the external surface area is typically expected to increase in proportion to an increase in the number of projections, it may not be increased in proportion thereto upon application to fiber spinning. When the number of spinning nozzles is increased to increase the number of projections, a viscous spinning dope may aggregate while passing through the spinneret and distinct projections are not formed but a round shape is formed, undesirably resulting in a circular cross-section. Thus, in the present invention, when the number of projections of the modified cross-section is 3, space occupancy and the external surface area may be maximized.

Conventionally, a lyocell fiber for a tobacco fiber, manufactured using natural cellulose, which increases the rate of biodegradation and less affects changes in tobacco taste, and a tow for a tobacco filter using the same, have been studied, but only a circular cross-section has been realized due to the absence of techniques for commercially manufacturing lyocell fibers having a modified cross-section and lyocell tows using the same because of the spinning of lyocell fibers using natural cellulose and the properties of materials.

A lyocell fiber and tow for a cylindrical tobacco filter, having a circular cross-section, may suffer from low efficiency of removal of tobacco smoke because of insufficient collision thereof with the tobacco smoke passing through the tobacco filter, compared to cellulose acetate tows having a modified cross-section, and thus, the tobacco taste may become different from that of conventional cellulose acetate filters.

However, the lyocell material having a modified cross-section according to the present invention enables the manufacture of a lyocell fiber and tow having a large external surface area using the same weight of spinning dope for a given circular cross-section, thus minimizing changes in tobacco taste. In particular, compared to the cellulose acetate tow, the lyocell material of the invention has high biodegradability, and may thus alleviate the waste problem caused by cigarette butts. A variety of properties may be exhibited depending on the cross-sectional shape of the lyocell fiber. Even when the lyocell material of the invention is used in a small amount, properties equal or superior to those of conventional tobacco filters may be manifested.

Below is a detailed description of steps of the method of manufacturing a lyocell material having a modified cross-section for a tobacco filter according to the present invention.

[(S1) Step]

(S1) is a step of spinning a lyocell spinning dope comprising a cellulose pulp and an N-methylmorpholine-N-oxide (NMMO) aqueous solution.

The lyocell spinning dope may include 6 to 16 wt % of a cellulose pulp and 84 to 94 wt % of an NMMO aqueous solution, based on the total weight of the dope, and the cellulose pulp may include 85 to 97 wt % of alpha-cellulose based on the total weight of the pulp and may have a degree of polymerization (DPw) of 600 to 1700. If the amount of cellulose pulp is less than 6 wt %, it is difficult to acquire fibrous properties. On the other hand, if the amount thereof exceeds 16 wt %, dissolution in the aqueous solution may become difficult. Also, if the amount of the NMMO aqueous solution is less than 84 wt %, the dissolution viscosity may remarkably increase, which is undesirable. On the other hand, if the amount thereof exceeds 94 wt %, the spinning viscosity may considerably decrease, making it difficult to manufacture uniform fibers in a spinning process.

In a preferred aspect of the present invention, the NMMO aqueous solution may include NMMO and water at a weight ratio of 93:7 to 85:15. If the weight ratio of NMMO and water exceeds 93:7 and thus the concentration of NMMO increases, the dissolution temperature may increase, and thus cellulose may be degraded upon the dissolution of cellulose. On the other hand, if the weight ratio thereof is less than 85:15 and thus the concentration of NMMO decreases, the dissolution performance of the solvent may deteriorate, making it difficult to dissolve cellulose.

The spinning dope is discharged from the spinning nozzle of a spinneret. As such, the spinneret functions to discharge the filamentary spinning dope into a coagulation solution in a coagulation bath through an air gap. Discharging the spinning dope from the spinneret may be performed at a spinning temperature of 80 to 130° C.

The spinneret may have a plurality of unit holes each comprising multiple holes. The number of holes of each unit hole may be identical to the number of projections of the modified cross-section. For example, in order to manufacture a lyocell fiber composed of a monofilament having a modified cross-section with three projections, the number of holes of the unit hole may be 3.

[(S2) Step]

(S2) is a step of coagulating the lyocell spinning dope spun in (S1) to obtain a lyocell multifilament. The coagulation in (S2) may include primary coagulation, including subjecting the spinning dope to air quenching (Q/A) using cold air, and secondary coagulation, including immersing the primarily coagulated spinning dope in a coagulation solution.

After discharging of the spinning dope through the spinneret in (S1), the dope may pass through the air gap between the spinneret and the coagulation bath. In the air gap, the cold air is supplied outwards from an air-cooling part positioned inside the donut-shaped spinneret, and primary coagulation may be carried out by air quenching for supplying the cold air to the spinning dope.

The factors that have an influence on the properties of the lyocell multifilament obtained in (S2) include the temperature and the wind velocity of the cold air in the air gap, and the coagulating in (S2) may be performed by supplying the cold air at a temperature of 4 to 15° C. and a wind velocity of 5 to 50 m/s to the spinning dope.

If the temperature of the cold air upon primary coagulation is lower than 4° C., the surface of the spinneret may be cooled, the cross-section of the lyocell multifilament may become non-uniform, and spinning processability may deteriorate. On the other hand, if the temperature thereof is higher than 15° C., primary coagulation using the cold air is not sufficient, thus deteriorating spinning processability. Also, if the wind velocity of the cold air upon primary coagulation is less than 5 m/s, primary coagulation using the cold air is not sufficient and spinning processability may deteriorate, undesirably causing yarn breakage. On the other hand, if the wind velocity thereof exceeds 50 m/s, the spinning dope discharged from the spinneret may be shaken by the air, and spinning processability may thus deteriorate.

After primary coagulation using air quenching, the spinning dope is supplied into the coagulation bath containing the coagulation solution to undergo secondary coagulation. In order to appropriately carry out secondary coagulation, the temperature of the coagulation solution may be set to 30° C. or less, and preferably 5 to 30° C. This is because the temperature for secondary coagulation is not excessively high and thus the coagulation rate is properly maintained. The coagulation solution may be prepared without particular limitation so long as it has a composition that is typical in the art to which the present invention belongs.

[(S3) Step]

(S3) is a step of water-washing the lyocell multifilament obtained in (S2). Specifically, the lyocell multifilament obtained in (S2) is placed on a draw roller and then into a water-washing bath, and is thus washed with water.

Upon water-washing of the filament, a water-washing solution at 0 to 100° C. may be used, taking into consideration the recovery and reuse of the solvent after the water-washing process. The water-washing solution may include water, and may further include other components, as necessary.

[(S4) Step]

(S4) is a step of oiling the lyocell multifilament water-washed in (S3). The oiling treatment may be performed by completely immersing the multifilament in oil, and the amount of oil on the filament may be maintained uniform using a press roller attached to the entry roll and the release roll of an oiling device. The oil functions to decrease friction of the filament upon contact with the roller and the guide and in the crimping process. The oil is not limited so long as it is typically used.

[(S5) Step]

(S5) is a step of crimping the lyocell multifilament oiled in (S4) using steam and pressure to obtain a crimped tow, thereby yielding a lyocell tow suitable for use in a tobacco filter. Crimping is a process in which the multifilament is crimped, and is performed using a stuffer box, thus obtaining a crimped tow having 15 to 60 crimps per inch.

According to a preferred aspect of the present invention, the lyocell multifilament in (S5) is supplied with steam at 0.05 to 2.0 kgf/cm$^2$ through a steam box so as to increase the temperature thereof, and is then pressed using a press roller at a pressure of 1.0 to 4.0 kgf/cm$^2$, thereby forming crimps in the stuffer box.

If the amount of supplied steam is less than 0.05 kgf/cm$^2$, crimps are not efficiently formed. On the other hand, if the amount thereof exceeds 2.0 kgf/cm$^2$, the temperature of the stuffer box is increased to 130° C. or higher, and thereby filaments become attached to each other and thus do not pass through the stuffer box. Also, if the pressure of the press roller is less than 1.0 kgf/cm$^2$, the desired number of crimps may not be formed. On the other hand, if the pressure thereof exceeds 4.0 kgf/cm$^2$, the pressing force is too strong, and thus the filaments do not pass through the stuffer box.

In order to satisfy the properties required of a tobacco filter, the number of crimps per inch is regarded as important, and is set to 15 to 60, and preferably 25 to 35, in the lyocell fiber having a modified cross-section according to a preferred aspect of the present invention. If the number of crimps per inch is less than 15, opening of the tow is not easy during the manufacturing of the tobacco filter, undesirably causing processing problems. Furthermore, suction resistance, filter hardness, and smoke removal performance, which are required of the tobacco filter, may become unsatisfactory. On the other hand, if the number of crimps per inch exceeds 60, non-uniform pressing may occur in the stuffer box, and the tow may not efficiently pass through the box, making it difficult to manufacture a crimped tow.

Since the lyocell crimped tow having a modified cross-section for a tobacco filter, as mentioned above, is biodegradable, when a cigarette butt is discarded, it may biodegrade and is thus environmentally friendly. Furthermore, the monofilament has a modified cross-sectional shape including a plurality of projections, and thus the external surface area of the lyocell fiber of the invention is increased compared to that of a conventional lyocell fiber having a circular cross-section. Even when the lyocell fiber of the invention is used in a small amount, properties equal or superior to those of conventional materials may be exhibited.

Mode for Invention

EXAMPLES

A better understanding of the present invention may be obtained through the following examples which are set forth to illustrate, but are not to be construed to limit the present invention.

Example 1

In order to manufacture a lyocell fiber having a modified cross-section, a spinning dope for manufacturing a lyocell fiber was first prepared by mixing a cellulose pulp having DPw of 820 and 93.9% of alpha-cellulose with an NMMO/$H_2O$ solvent mixture (weight ratio 90/10) containing 0.01 wt % of propyl gallate so that the amount of the cellulose pulp was 12 wt % (which means that the concentration of the spinning dope was 12%) based on the total weight of the mixture.

Next, the spinning dope was spun at a spinning temperature of 110° C. from the spinning nozzle of a spinneret having a plurality of unit holes each realized as three holes, while adjusting the amount of the spinning dope to be discharged and the spinning rate so that the fineness per filament was 3.37 denier. The filamentary spinning dope discharged from the spinning nozzle was continuously fed into a coagulation solution in a coagulation bath through an air gap.

The spinning dope was primarily coagulated using cold air at a temperature of 8° C. and a wind velocity of 10 m/s in the air gap. The coagulation solution had a temperature of 25° C. and was composed of 85 wt % water and 15 wt % NMMO. As such, the concentration of the coagulation solution was continuously monitored using a sensor and a refractometer.

Subsequently, the filaments drawn in the air layer through a draw roller were washed with a water-washing solution sprayed using a water-washing device to remove the remaining NMMO, and furthermore, the filaments were sufficiently uniformly impregnated with oil and then pressed so that the filaments had an oil content of 0.2%, and then dried at 150° C. using a drying roller, thus obtaining a lyocell multifilament comprising a monofilament having a modified cross-section with three projections.

Finally, the lyocell multifilament having a modified cross-section thus obtained was increased in temperature while passing through a steam box (pressure: 0.1 kgf/$cm^2$), and then crimped in a stuffer box through a press roller (pressure: 1.5 kgf/$cm^2$), thus yielding a lyocell crimped tow having a modified cross-section with 25 crimps/inch.

Example 2

A lyocell crimped tow having a modified cross-section with three projections was manufactured in the same manner as in Example 1, with the exception that the fineness per filament was 3.58 denier.

Example 3

A lyocell crimped tow having a modified cross-section with three projections was manufactured in the same manner as in Example 1, with the exception that the fineness per filament was 14.82 denier.

Comparative Example 1

A lyocell crimped tow having a circular cross-section was manufactured in the same manner as in Example 1, with the exception that a spinneret having a plurality of unit holes each having a single circular hole was used, and the fineness per filament was 1.73 denier.

Comparative Example 2

A lyocell crimped tow having a circular cross-section was manufactured in the same manner as in Comparative Example 1, with the exception that the fineness per filament was 2.97 denier.

Test Example

For the lyocell crimped tows manufactured in the above Examples and Comparative Examples, the cross-sectional shape of the monofilament contained in the lyocell fiber, fineness, and space occupancy were measured as follows. The results are shown in Table 1 below.

(1) Cross-Sectional Shape of Monofilament Contained in Lyocell Fiber

A small amount of a fiber bundle was sampled, rolled together with black cotton, made thin, fitted into a hole in a plate for cross-sectional cutting, and then cut with a razor blade so that the cross-section thereof was not pushed. The cut cross-section was observed at a magnification (×200) using an optical microscope, and the image thereof was stored in a digital camera. For the cross-sectional image of the fiber, the cross-section to be analyzed was determined using an Olympus soft imaging solution program and the radius and area thereof were analyzed.

(2) Fineness

The fineness of the fiber was determined from the cross-sectional area of the actual lyocell fiber and the fiber density obtained through cross-section analysis.

Density of lyocell fiber: 1.49 g/$cm^3$

Fiber fineness=[cross-sectional area of fiber ($\mu m^2$)×density (g/$cm^3$)×9000 (m)]/100000

(3) Space Occupancy

The space occupancy of the lyocell fiber was calculated based on Equation 1 below.

$$\text{Space occupancy}(\%) = (\text{area of first virtual circle}/\text{cross-sectional area of monofilament contained in lyocell fiber}) \times 100 \quad \text{(Equation 1)}$$

TABLE 1

Cross-section of monofilament of lyocell fiber

|  | 1st virtual circle radius (L1, μm) | 2nd virtual circle radius (L2, μm) | 1st virtual circle area (μm²) | Actual cross-sectional area of monofilament in modified cross-section lyocell fiber (μm²) | Fineness (De) | L1/L2 | Space occupancy (%) |
|---|---|---|---|---|---|---|---|
| Ex.1 | 16.75 | 3.87 | 881 | 251.6 | 3.37 | 4.33 | 350 |
| Ex.2 | 11.44 | 6.16 | 411 | 266.6 | 3.58 | 1.86 | 154 |
| Ex.3 | 27.78 | 11.61 | 2423 | 1105 | 14.82 | 2.40 | 219 |
| C.Ex.1 | 6.4 | 6.4 | 129 | 129 | 1.73 | 1 | 100 |
| C.Ex.2 | 8.4 | 8.4 | 222 | 222 | 2.97 | 1 | 100 |

Figure 2A:
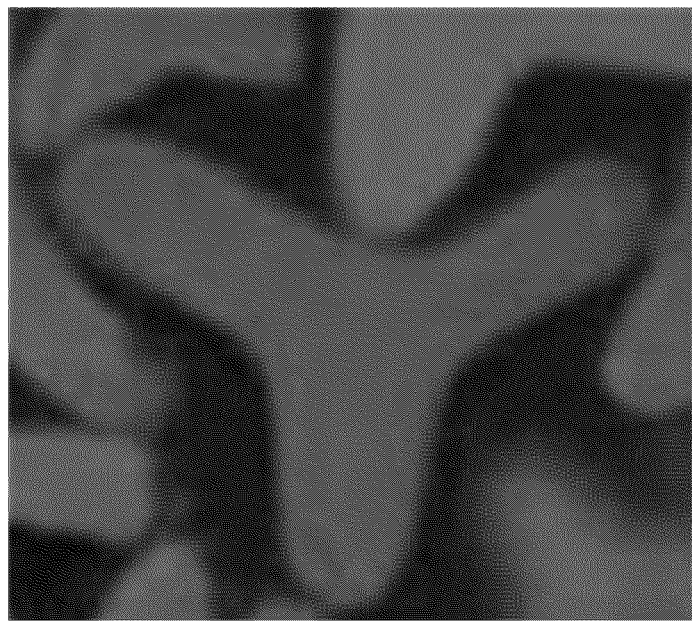
FIGS. 2a to 2c are images showing the cross-sections of lyocell fibers manufactured in Examples of the present invention, FIG. 2a illustrating Example 1, FIG. 2b illustrating Example 2, and FIG. 2c illustrating Example 3.
Figure 2B:
Figure 2C:

As is apparent from Table 1, the lyocell fibers of Examples 1 to 3, comprising monofilaments having modified cross-sections, exhibited large space occupancy, compared to the lyocell fibers of Comparative Examples 1 and 2, comprising monofilaments having circular cross-sections. Here, the modified cross-sections of Examples 1 to 3 are illustrated in FIGS. 2a to 2c, respectively.

Based on these results, the lyocell fibers of Examples 1 to 3 were found to have a large external surface area, and can thus be widely applied in fields requiring fibers having a large external surface area.

The invention claimed is:

1. A lyocell material having a modified cross-section for a tobacco filter, manufactured by spinning a lyocell spinning dope comprising a cellulose pulp and an N-methylmorpholine-N-oxide (NMMO) aqueous solution to produce a lyocell multifilament and crimping the lyocell multifilament to yield a crimped tow having 31 to 60 crimps per inch,
wherein the lyocell multifilament comprises a monofilament having a modified cross-section,
the modified cross-section includes a plurality of projections, and
the plurality of projections come into contact with a first virtual circle and a second virtual circle included in the first virtual circle, are integrally formed with the second virtual circle serving as a center, and come into contact with the first virtual circle at ends thereof, a ratio (L1/L2) of a radius (L1) of the first virtual circle to a radius (L2) of the second virtual circle ranging from 1.5 to 5.0,
wherein the first virtual circle has a radius (L1) of 8 to 27.78 μm, and
wherein the cellulose pulp has a degree of polymerization (DPw) of 600 to 1700.

2. The lyocell material of claim 1, wherein the lyocell spinning dope comprises 6 to 16 wt % of the cellulose pulp and 84 to 94 wt % of the N-methylmorpholine-N-oxide aqueous solution based on a total weight of the spinning dope.

3. The lyocell material of claim 2, wherein the cellulose pulp comprises 85 to 97 wt % of alpha-cellulose based on a total weight of the pulp.

4. The lyocell material of claim 1, wherein the lyocell material has a space occupancy of 150 to 400%, as defined as Equation 1 below:

$$\text{Space occupancy}(\%) = (\text{area of first virtual circle} / \text{cross-sectional area of monofilament contained in lyocell fiber}) \times 100. \quad \text{Equation 1}$$

5. The lyocell material of claim 1, wherein the second virtual circle has a radius (L2) of 3 to 12 μm.

6. The lyocell material of claim 1, wherein a number of points of contact of the first virtual circle and the second virtual circle with a cross-section of the monofilament is 3.

7. The lyocell material of claim 1, wherein the first virtual circle and the second virtual circle are concentric.

8. The lyocell material of claim 1, wherein the crimped tow has 31 to 35 crimps per inch.

* * * * *